(12) United States Patent
Mason

(10) Patent No.: US 8,161,671 B2
(45) Date of Patent: Apr. 24, 2012

(54) GREETING CARD WITH RECORDABLE SOUND MODULE AND IMAGE RETAINING WINDOW

(76) Inventor: Barbara J. Mason, Frisco, TX (US)

( * ) Notice: Subject to any disclaimer, the term of this patent is extended or adjusted under 35 U.S.C. 154(b) by 23 days.

(21) Appl. No.: 12/777,824

(22) Filed: May 11, 2010

(65) Prior Publication Data

US 2011/0088293 A1  Apr. 21, 2011

Related U.S. Application Data

(60) Provisional application No. 61/177,123, filed on May 11, 2009.

(51) Int. Cl.
*G09F 1/00* (2006.01)
(52) U.S. Cl. .................................. 40/124.03; 40/124.11
(58) Field of Classification Search ............... 40/124.03, 40/124.11
See application file for complete search history.

(56) References Cited

U.S. PATENT DOCUMENTS

| | | | | | |
|---|---|---|---|---|---|
| 5,303,487 | A | * | 4/1994 | Olson | 40/124.12 |
| 5,375,351 | A | * | 12/1994 | King et al. | 40/124.04 |
| 5,923,556 | A | * | 7/1999 | Harris | 700/117 |
| 6,209,924 | B1 | * | 4/2001 | Pyle et al. | 283/117 |
| 6,845,583 | B2 | * | 1/2005 | Lee | 40/717 |
| 7,127,841 | B1 | * | 10/2006 | Weber | 40/124.03 |
| 2006/0010734 | A1 | * | 1/2006 | Boydston | 40/124.17 |

* cited by examiner

*Primary Examiner* — Gary Hoge
(74) *Attorney, Agent, or Firm* — Conley Rose, P.C.; Kristin Jordan Harkins

(57) ABSTRACT

A greeting card is provided. The greeting card comprises a card having an image viewing window and a sound module attached to the card. The sound module comprises a microphone, a first switch for activating a recording function of the sound module, and a second switch for activating a playback function of the sound module.

7 Claims, 1 Drawing Sheet

GREETING CARD WITH RECORDABLE SOUND MODULE AND IMAGE RETAINING WINDOW

CROSS-REFERENCE TO RELATED APPLICATIONS

The present application claims priority to and the benefit under 35 U.S.C. §119(e) of U.S. Provisional Patent Application Ser. No. 61/177,123 filed May 11, 2009 and entitled "Greeting Card with Recordable Sound Module and Image Retaining Window," hereby incorporated herein for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Greeting cards are a recognized method of making announcements, celebrating special events and expressing feelings and thoughts to family members, friends, and associates. Greeting cards are commonly available from a wide variety of retail outlets, including retail stores and online websites, for example, and they may be specialized for many different occasions and circumstances. Typically, a greeting card is purchased with an appropriately sized envelope and either mailed or hand delivered to the card recipient.

SUMMARY

In an embodiment, a greeting card is disclosed. The greeting card comprises a card having an image viewing window and a sound module attached to the card. The sound module comprises a microphone, a first switch for activating a recording function of the sound module, and a second switch for activating a playback function of the sound module.

In an embodiment, a method is disclosed. The method comprises receiving a recording of a heartbeat of an in utero baby, copying the recording of the heartbeat to a sound module of a first greeting card, receiving a recording of a sonogram image of the in utero baby, printing a hardcopy of the sonogram image, and placing the printed hardcopy of the sonogram image in a viewing window of the first greeting card.

In an embodiment, a method is disclosed. The method comprises storing on a sound module of a greeting card a heartbeat of an in utero baby sensed by one of an active sonogram machine and a baby heartbeat monitor, the storing on the sound module performed in an office, printing a sonogram image of the in utero baby, and placing the sonogram image in an image viewing window of the greeting card.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether or not currently known or in existence. The disclosure should in no way be limited to the illustrative implementations, drawings, and techniques detailed below, but may be modified within the scope of the appended claims along with their full scope of equivalents.

A novel greeting card comprising a sound module and an image retaining window are taught by the present disclosure. In an embodiment, the greeting card is suitable for recording a specific sound or greeting associated with the theme of the greeting card and storing an image, such as a photograph. In an embodiment, the greeting card is suitable for recording the heartbeat of a baby in utero, storing a sonogram image of the baby, mailing or hand-delivering the greeting card to the recipient, such as family or friends, and playing back the recording of the heartbeat. In an embodiment, the greeting card may comprise a sound module operable to record and playback sounds. An operator of the card, for example an expectant mother or an obstetrician, may activate a recording function of the sound module to record the heartbeat of an in utero baby, for example, during the course of an ultrasound procedure performed during a prenatal exam in a doctor's office. The operator of the card may obtain a sonogram image of the in utero baby, for example during the course of a prenatal exam in a doctor's office, and slip the sonogram image of the in utero baby into the image retaining window of the greeting card. When the card is opened, for example by a parent of the expectant mother, playback of the recorded heartbeat of the in utero baby is actuated and the sonogram image of the in utero baby is displayed within the image retaining window.

Figure 1:
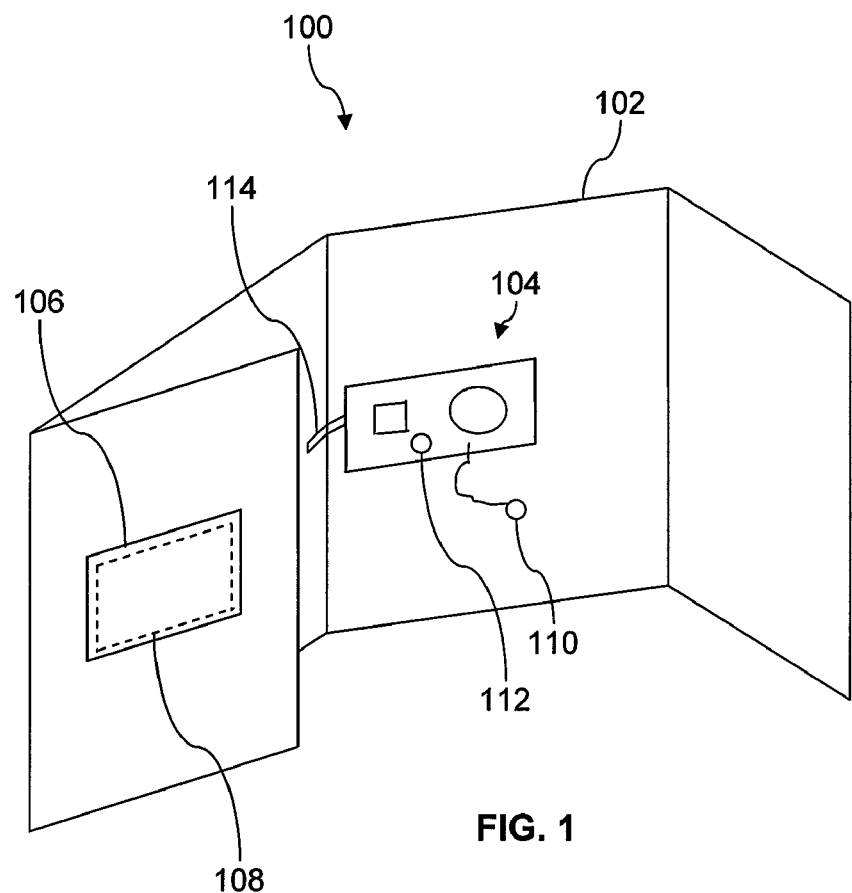
FIG. 1 presents a perspective view of a greeting card, unfolded to depict certain component features, according to an embodiment of the disclosure.
Figure 2:
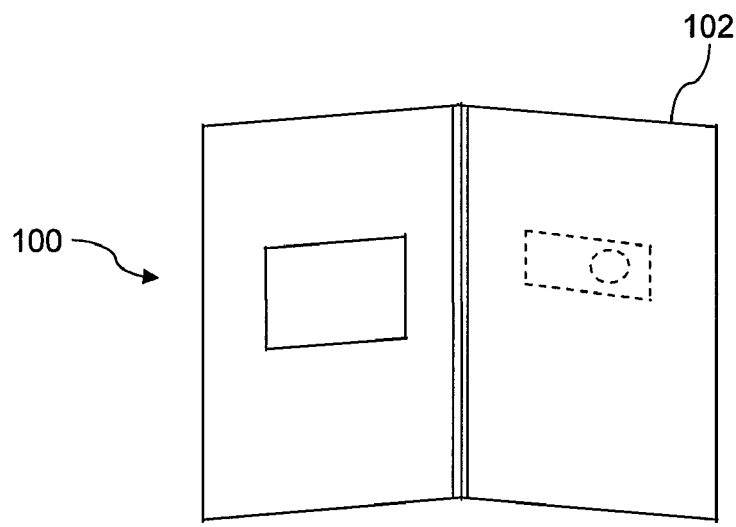
FIG. 2 presents a front plan view of a folded and finished greeting card in an open position, according to an embodiment of the disclosure.

FIG. 1 illustrates a greeting card 100 in an unfolded format to display certain component features, and FIG. 2 illustrates the greeting card of FIG. 1 in a folded and finished format, and in an open position. In an embodiment, the greeting card 100 comprises a multi-fold card 102, a sound module 104, and an image retaining window 106. While illustrated in FIG. 1 as having four panels and three folds, in other embodiments, the card 102 may have greater or fewer numbers of panels and/or folds. The multi-fold card 102 may be formed of any of a variety of materials including paper, cardboard, plastic, stiffened fabric, and other foldable material. While the multi-fold card 102 is illustrated in FIG. 1 as being substantially rectangular, in some embodiments the multi-fold card 102 may have one or more curved edges and/or boundaries. It is contemplated that the card 102 may be printed with suitable art, for example paintings, watercolors, drawings, and/or photographs. The card 102 may comprise some pre-printed words, and/or the card 102 may provide some blank area for writing a personal message.

The sound module 104 is operable to record and play back a personal audio. In an embodiment, a recording switch 110 may be actuated to record the personal audio, for example a heartbeat sound of an in utero baby. In another embodiment, however, another means of recording actuation may be employed by the sound module 104, for example voice activation commands and other actuation inputs. As illustrated in FIG. 2, when the two outermost panels are folded closed, the sound module 104 is hidden from view.

The sound module 104 may comprise a microphone 112 for receiving the acoustic signal of the personal audio to be recorded and transforming the acoustic signal to an electrical signal that may be processed by the sound module 104, for example digitizing the electrical signal and storing the digitized signal in an electronic memory of the sound module 104. The audio may be stored in any of a variety of digital audio formats known to those skilled in the art. In an embodiment, the sound module 104 may have an interface that permits an audio recording to be downloaded to the sound module 104, for example downloaded to an electronic memory of the sound module 104.

The sound module 104 may further comprise a playback switch 114 such that when the playback switch 114 is actuated, the previously recorded audio is played back by the sound module 104, for example over a speaker of the sound module 104. In an embodiment, the sound module may comprise an electrical power source such as a battery. In an embodiment, the opening of the card 102 to the position shown in FIG. 2 actuates the playback switch 114 and initiates playback of the previously recorded audio. In such an embodiment, closing the card 102 may de-actuate the playback switch 114 and halt the playback of the previously recorded audio.

In an embodiment, the image retaining window 106 is provided by a cut-out in one of the panels of the multi-fold card 102. An image 108, for example a sonogram image of a baby in utero, is retained behind the panel and viewable through the image retaining window 106. A variety of means may be employed to retain the image 108, including at least a partial border of partially adhering material behind the fold, a pocket formed by a piece of material glued behind the panel allowing the image 108 to be slid into the pocket, retaining clips, and other retaining means. The image-retaining window 106 may be provided on any external or internal surface of the card.

A business method for distributing and selling the novel greeting card is taught by the present disclosure. The card 102 may be distributed and sold in retail outlets, for example discount stores, grocery stores, card specialty shops, via websites, and in all retail outlets where greeting cards are typically sold. The card 102 may also be distributed to prenatal care doctors and/or prenatal care centers. For example, the card 102 may be displayed for sale at a check-in desk or a greeting desk of a prenatal care doctor's office and/or prenatal care center. The card 102 may be displayed for sale in an examining room and/or an ultrasound room of the prenatal care doctor's office and/or prenatal care center.

A method for constructing and delivering the novel greeting card is taught by the present disclosure. The doctor's office may charge a modest service charge for providing to the expectant mother one or more copies of the sonogram image of the in utero baby and for recording and providing an audio recording of the heartbeat of the in utero baby, for example by activating the recording switch 110 of the card 102 while holding the microphone 112 proximate to the speaker of an in utero baby heartbeat monitor instrument and/or an proximate to the speaker of an active sonogram machine. An active sonogram machine may be a sonogram that emits sonic energy and receives reflections of the emitted sonic energy from body tissues. Using the sonogram image and heartbeat recording, the expectant mother may construct one or a plurality of cards 102, each card containing a copy of the sonogram image of the in utero baby and the recording of the in utero baby heartbeat. Alternatively, the doctor's office may store the audio of the in utero baby on the heartbeat monitor instrument, store the sonogram image of the in utero baby on the ultrasound instrument, and construct one or a plurality of cards 102, each card 102 containing a copy of the sonogram image of the in utero baby and the recording of the in utero baby heartbeat. The doctor's office may construct the cards 102 after the completion of the workday and mail the cards 102 out to a list of addresses provided by the expectant mother during the course of her prenatal care visit. Alternatively, in an embodiment, the sonogram image of the in utero baby and/or the recording of the in utero baby heartbeat, in digitized form, may be transmitted over a communication network along with a list of recipient addresses to a third party for constructing the cards 102 and mailing the cards 102. The third party may be an independent business, for example a business that also sells and distributes the cards 102.

Because the heartbeat of an in utero baby changes with the age of the baby, an expectant mother may wish to record the heartbeat of her in utero baby several times during the course of her pregnancy, for example sending multiple cards to her family and friends over the course of her pregnancy as the baby develops.

While the disclosure above describes uses of the greeting card 100 in the context of an expectant mother sharing her excitement with family and friends, in combination with the present disclosure, one skilled in the art will readily appreciate that the greeting card 100 may be used to capture and share other significant events, such as, for example, a wedding engagement, a high school or college graduation, the opening of a new business, a new home, a retirement, and the like. Moreover, the greeting card 100 may be used to personalize a standard greeting card by adding a voice message and a photograph of the sender, for example to a birthday card, a Mother's Day card, a holiday card, and the like.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method, comprising:
receiving a recording of a heartbeat of an in utero baby;
copying the recording of the heartbeat to a sound module of a first greeting card;

receiving a recording of a sonogram image of the in utero baby;

printing a hardcopy of the sonogram image; and placing the printed hardcopy of the sonogram image in a viewing window of the first greeting card.

2. The method of claim 1, further comprising:

copying the recording of the heartbeat to the sound modules of a plurality of greeting cards;

printing a plurality of hardcopies of the sonogram image of the in utero baby; and placing the plurality of hardcopies of the sonogram image in the viewing windows of the plurality of greeting cards.

3. A method, comprising:

storing on a sound module of a greeting card a heartbeat of an in utero baby sensed by one of an active sonogram machine and a baby heartbeat monitor, the storing on the sound module performed in an office;

printing a sonogram image of the in utero baby; and placing the sonogram image in an image viewing window of the greeting card.

4. The method of claim 3, further comprising:

storing on the sound modules of a plurality of greeting cards the heartbeat of the in utero baby sensed by one of the active sonogram machine and the baby heartbeat monitor, the storing on the sound modules performed in the office;

printing a plurality of sonogram images of the in utero baby; and placing the plurality of sonogram images in the image viewing windows of the plurality of greeting cards.

5. The method of claim 3, further comprising activating a recording function of the sound module in the office while the greeting card is proximate to one of a speaker of an active sonogram machine and a speaker of a baby heartbeat monitor, whereby the storing on the sound module of the heartbeat is initiated.

6. The method of claim 3, further comprising downloading a recording of the heartbeat of the in utero baby to the sound module of the greeting card, whereby the storing on the sound module of the heartbeat is initiated.

7. The method of claim 3, further comprising activating a playback function of the sound module to play the recording of the heartbeat of the in utero baby.

\* \* \* \* \*